US006136454A

United States Patent [19]

Cordy

[11] Patent Number: 6,136,454

[45] Date of Patent: Oct. 24, 2000

[54] COBALT-TIN ALLOY COATING ON ALUMINUM BY CHEMICAL CONVERSION

[75] Inventor: Carl Edward Cordy, Greenfield, Ind.

[73] Assignee: Ford Motor Company, Dearborn, Mich.

[21] Appl. No.: 09/317,460

[22] Filed: May 24, 1999

Related U.S. Application Data

[63] Continuation-in-part of application No. 09/050,215, Mar. 30, 1998, Pat. No. 5,911,809.

[51] Int. Cl.[7] .............................. B32B 15/01; C23C 22/00

[52] U.S. Cl. .......................... 428/646; 148/243; 148/273; 148/275; 148/285; 428/650; 428/652; 428/628; 428/629; 428/469; 428/908.8; 428/926; 428/936

[58] Field of Search .................................... 428/646, 650, 428/652, 628, 629, 469, 908.8, 926, 936; 148/243, 273, 275, 285; 420/557

[56] References Cited

U.S. PATENT DOCUMENTS

| | | | |
|---|---|---|---|
| 3,951,760 | 4/1976 | Fueki et al. | 205/259 |
| 4,018,949 | 4/1977 | Donakowski et al. | 148/273 |
| 4,278,477 | 7/1981 | Reinhold | 148/273 |
| 4,568,252 | 2/1986 | Hattori et al. | 417/269 |
| 4,696,867 | 9/1987 | Eastwood | 428/650 |
| 4,795,682 | 1/1989 | Turner et al. | 428/646 |
| 5,056,417 | 10/1991 | Kato et al. | 92/71 |
| 5,116,692 | 5/1992 | Mori et al. | 428/650 |
| 5,415,077 | 5/1995 | Ono | 92/71 |
| 5,468,130 | 11/1995 | Yamada et al. | 418/55.2 |
| 5,510,145 | 4/1996 | Shepherd et al. | 427/242 |
| 5,630,355 | 5/1997 | Ikeda et al. | 92/169.1 |
| 5,655,432 | 8/1997 | Wilkosz et al. | 92/71 |
| 5,712,049 | 1/1998 | Huhn et al. | 428/646 |
| 5,911,809 | 6/1999 | Cordy | 92/12.2 |

*Primary Examiner*—Deborah Jones
*Assistant Examiner*—Robert R. Koehler

[57] ABSTRACT

An aluminum or aluminum alloy surface which during use is exposed to sliding friction is coated to provide a chemical conversion coating of tin comprising 0.2–10.0 wt. % cobalt. For example, a swash plate type compressor has a cylinder block with cylinder bores disposed parallel to the axis of the cylinder block. A rotary shaft rotatably mounted within the cylinder block carries an aluminum swash plate. The swash plate has a coating preferably between 0.8 to 2.5 microns. The coating on the swash plate permits the use of low silicon alloy aluminum without the need of metal plating or high finish polishing.

18 Claims, 2 Drawing Sheets

COBALT-TIN ALLOY COATING ON ALUMINUM BY CHEMICAL CONVERSION

This is a Continuation-in-Part of U.S. patent application Ser. No. 09/050,215 filed Mar. 30, 1998, now U.S. Pat. No. 5,911,809.

FIELD OF THE INVENTION

The present invention relates to a cobalt—tin coating provided on aluminum or aluminum alloy by chemical conversion to reduce the sliding friction of the surface and reduce wear of contacted components. The coating may be applied to surfaces such as swashplate type compressors as disclosed U.S. patent application Ser. No. 09/050,215 or other aluminum surfaces, such as pistons.

BACKGROUND OF THE INVENTION

Conventionally, a swash plate type compressor is used in systems such as an air conditioning system of an automobile. According to a known swash plate type compressor, the transmission of motive power is carried out, as a swash plate and a piston reciprocate, thereby suctioning, compressing and discharging the gas. The swash plate is usually composed of aluminum or aluminum alloy and shoes, which make slideable contact with the swash plate when it rotates, are composed of iron or light weight ceramics such as alumina. The metal on metal contact at the shoe and swash plate interface requires special precautions to be taken in order to prevent undue wear and possible seizure of the shoe with the swash plate.

In a conventional swash plate compressor, the following problems are likely to occur. 1) The amount of oil contained in the refrigerant gas is decreased if the refrigerant leaks out of the swash plate type compressor. When the swash plate type compressor is operated under this state, lubrication at the sliding surface of the swash plate is decreased. In an extreme case, seizure of the shoe at the sliding surface of the swash plate occurs due to the generation of high temperature friction heat. 2) In the case where the compression of the liquid refrigerant takes place, the lubrication at the sliding surface of the swash plate is decreased. As a result, seizure of the shoe with the surface of the swash plate may occur.

Several methods have been developed to improve the lubrication at the shoe/swash plate interface and to lessen the wear of compressor swash plates. Conventional swash plates are treated with a tin coating to improve surface wear.

U.S. Pat. No. 5,655,432 treated the swash plate with a cross-linked polyfluoro elastomer bonded directly to the aluminum, a lubricious additive and a load bearing additive. The material is applied as a viscous fluid and is masked part in order to coat the component only at certain areas. The coating is also applied in a range of 13–50 microns and since the maximum allowed variation is only 10 microns the parts require machining after coating. The coating process itself adds to manufacturing complexity, and makes it more difficult to hold manufacturing tolerances than with a conventional tin conversion coating.

U.S. Pat. No. 5,056,417 treated the swash plate body with a surface coating layer made of tin and at least one metal selected from the group consisting of copper, nickel, zinc, lead and indium. While any of these five materials are alloyed with tin to improve its wear resistance, none of them are described as also acting to bind the coating to the swashplate.

The present invention discloses a tin/cobalt conversion coating with improved wear resistance and also excellent adhesion to aluminum or aluminum alloy surfaces which experience during use, sliding friction, e.g., surfaces of swashplates, pistons, etc. The coating retains the high-lubricity of tin on the aluminum swashplate. Thus, in the current invention, the added cobalt provides a tin/cobalt surface coating with improved adhesion over a conventional adherent coating tin conversion coating, which improves the wear resistance of the aluminum surface.

SUMMARY OF THE INVENTION

The invention is an article having an aluminum or aluminum alloy surface which carries a single layer conversion coating of tin with 0.2 to 10 wt. % cobalt. The coating is formed by chemical conversion whereby at least a portion of said surface is exposed to an aqueous chemical conversion bath for aluminum. And the bath contains soluble tin and cobalt compounds in amounts sufficient to provide said conversion coating which, during use of the article, is exposed to sliding friction. Examples of such article include swashplates and pistons.

A swash plate compressor has a cylinder block that has a cylinder bore disposed parallel to the axis of said cylinder block. A rotary shaft rotatably mounted within said cylinder block and a piston reciprocally fitted in the cylinder bore. The shoes slideably intervene between the piston and the swash plate. The swash plate comprises a matrix composed of aluminum or aluminum alloy and on at least a part of the swash plate surface a tin conversion coating layer comprising 0.2–10 wt. % cobalt. The coated part of the surface of the swash plate is that which in slideable contact with the shoes during compressor operation.

DETAILED DESCRIPTION OF THE PREFERRED EMBODIMENTS

The invention relates to providing conversion coatings on aluminum or aluminum alloy, which may comprise an entire article or only a surface of the article, as when the article is steel or some other metal with a surface of aluminum provided thereon. The article or substrate may be, for example, a swashplate of an automotive compressor, or pistons, any article whose aluminum surface would benefit from increased lubricity and decreased wear provided by an adherent coating. These may also include connecting rods for piston engines or crankshaft based refrigeration/AC compressors. The article may also be a non-automotive article. As is well known in the art, in the conversion coating process a substrate is reacted with other materials (e.g., which may be a solids, liquids or gas) so that its surface is chemically converted into different compounds which have different properties. Further the process usually takes place at an elevated temperature where diffusion is often an essential aspect of the conversion. The conversion coating process and resultant coating is thus significantly different from coating processes like electrolytic deposition which is primarily concerned with deposition of ions, e.g., positive ions being deposited onto the cathode (negative electrode). As is known in the art, in the conversion coating process of aluminum, the surface aluminum, by means of alkalinity in the coating bath, solubilizes as an aluminate into the bath. Later, in the present invention it combines with the conversion coating materials, including cobalt and tin, to redeposit on the aluminum surface as a complex including tin and cobalt which is tightly chemically bonded and diffused into the aluminum surface. This is in contrast, for example, where a material is plated onto the surface of a metal. Often with conventional plating or coating process, an interlayer is applied between an aluminum substrate and the outer lubricious layer to bond the two together. The present invention conversion coating process invention thus avoids the manufacturing complexity associated with providing this interlayer/outer layer system.

Figure 1:
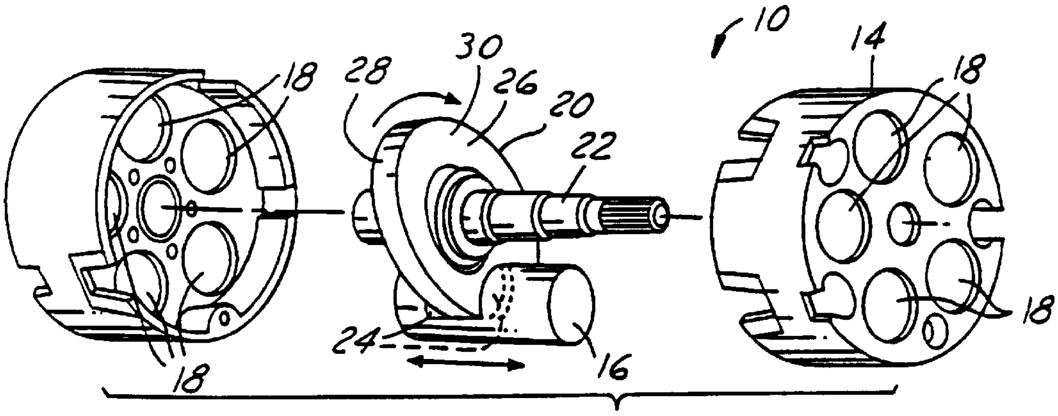
FIG. 1 is an exploded view of a swash plate compressor according to an embodiment of the present invention.

The swashplate is an example of aluminum or aluminum alloy surfaces which may be conversion coated according to the present invention and will hereafter be described in detail for exemplary purposes. As discussed above, however, other articles having an aluminum or aluminum alloy surface may be conversion coated according to the present invention. Illustrated in FIG. 1 is a perspective and exploded view of an automotive swash plate type compressor 10 for propelling refrigerant gas through a cooling circuit. The compressor 10 comprises a two-piece cylinder block 12, 14 which is provided with a plurality of reciprocating pistons 16. For clarity, FIG. 1 depicts only one of such reciprocating piston 16. In practice, each piston 16 reciprocates within cylinder bore 18.

Each piston 16 is in communication with the swash plate 20 which is fixably mounted on an axially extending rotateable shaft 22. The reciprocating motion of each piston 16 within its associated cylinder bore successively siphons, compresses, and discharges refrigerant gas. A pair of pivoting shoes 24 are positioned between each piston 16 and swash plate 20. The shoe 24 transfers the rotational motion of the swash plate 20 to the linear motion of the piston 16. The swash plate 20 has two facial surfaces 26 (only one shown for clarity) which contact the shoe 24.

Rotation of the shaft 22 causes the swash plate 20 to rotate between the cylinder blocks 12, and 14. The facial surfaces 26 contact the shoes 24 and are subjected to a shear-type frictional contact with shoe 24. An end surface 28 may contact the piston 16 if the piston 16 is slightly skewed or bent. End surface 28 and the facial surfaces 26 are coated to prevent wear from the contact with piston 16 and shoes 24. The surface coating 30 should also have a low coefficient of friction to increase the efficiency of the compressor.

The shape of swash plate 20 according to the present invention may be the same as those of the conventional swash plates. The material composing the matrix of swash plate body 20 should be aluminum or aluminum alloy. The aluminum alloy can be, for example, aluminum-high-silicon type alloy, aluminum—silicon magnesium type alloy, aluminum—silicon—copper—magnesium type alloy and, aluminum alloys containing no silicon.

Swash plate 20 is usually made from an aluminum or aluminum alloy material to make it light-weight and strong. Aluminum and aluminum alloys containing hypereutectic silicon, that is more silicon than is required to form a eutectic crystalline structure, are often used.

While the surface coating 30 of the present invention may be used with hypereutectic aluminum, it is primarily intended for use on non-hypereutectic aluminum and aluminum alloys having less than 13% by weight of silicon.

Hard grains, as used herein means grains having average particle diameters of 20 through 100 micrometer and a hardness greater than 300 on the Vickers hardness scale or, more preferably, having a hardness greater than 600 on the Vickers hardness scale, such as a primary crystal silicon. For example, aluminum-high-silicon type alloy can be considered as one of materials suitable materials for swash plate body 20. Because alsil alloy contains about 13% to 30% by weight of silicon meaning that alsil alloy contains more silicon than is required to form a eutectic crystal structure, alsil alloy has primary crystal silicon dispersed in the matrix structure. Also alsil has superior characteristics and could withstand very severe sliding operations at the swash plate.

Other materials having the hard grains and possibly applicable to swash plate body 20 are the intermetallic compounds of: aluminum—manganese; aluminum—silicon—manganese; aluminum—iron—manganese; aluminum—chromium and the like.

Conventionally, swashplate body 20 is made of aluminum or aluminum alloy directly contacts shoes 24. However, according to the present invention, during operation with surface coating layer 30, on swash plate body 20 contacts shoes 24 so that the frictional resistance with the shoes is greatly reduced. While it is only necessary to coat facial surface 26 having contact with shoes 24, for ease of manufacture the entire swash plate body 20 is coated.

According to the present invention, the swash plate body 20 has a surface coating layer 30. The surface coating layer 30 is formed on the surface of swash plate body 20 at least on the part of the surface having sliceable contact with shoes 24. The surface coating layer 30 may, however, be formed over the whole surface of the swash plate body 20. The surface coating layer 30 acts to reduce frictional resistance with shoes 24 and prevents the occurrence of seizure at the sliding facial surface 26 of the swash plate 20.

The present invention surface conversion coating layer 30 is composed primarily of tin, modified with cobalt. If surface coating layer 30 is composed only of tin the coefficient of friction will be lowered but at the same time, the surface coating layer becomes rather soft due to the characteristics of tin and, as a result, surface coating layer 30 will be susceptive to abrasion. In particular, based on the total weight of the tin and cobalt of surface coating 30, it comprises 0.2–10 wt. % cobalt, more preferably 0.2–2.1 wt. % cobalt and the balance being tin, most preferably being 98.9 to 99.7 wt. % tin and 0.3 to 1.1 wt. % cobalt, in some applications it is optimally 0.5 to 0.9 wt. % cobalt and the balance being tin.

It is found by the inventor of the present invention that the coexistence of tin and cobalt in the matrix structure of surface coating layer 30 provides a low coefficient of friction as well as improved hardness, so that high abrasion resistance is obtained. In addition, the adhesion of the coating to the swashplate 20 is improved by the addition of cobalt.

Surface coating 30 maybe applied to the swash plate 20 by means of a conversion coating. It is known in the art that conversion coating formation involves chemical reaction of the metal of the surface with components of the conversion coating bath. In the present invention, the pH of the bath is basic, that is, the pH is greater than 7 and the aluminum is oxidized and the tin reduced in the process of forming the coating.

An aqueous tin bath is prepared according to convention and then cobalt chloride is dissolved in the bath and the aqueous solution is heated to a temperature above 120° F. The concentration of cobalt in the bath is that necessary to provide a coating on the swash plate of 0.2–10 wt. % cobalt with the balance being tin. Preferably the bath is in between 120° F. and 150° F. To provide that amount of cobalt/tin on swash plate 20, the bath generally comprises 0.0063 to 0.63 wt. % cobalt chloride and 6–7.2 wt. % potassium stannate. More preferably, maintaining the same amount of potassium stannate, 0.017–0.32 wt. % cobalt chloride and most preferably 0.021–0.21 wt. % cobalt chloride. Additionally the bath comprises conventional materials like chelates and pH buffers. It has been found that including more chelates in the bath like EDTA (ethylenediamine tetracetic acid), gluconates, or diethylenediamine, the amount of cobalt which can be included in the bath is significantly increased. Increasing the amount of cobalt in the conversion coating increases its durability and adhesion to the aluminum substrate. Preferably the source of the cobalt ion is cobalt chloride, compounds such as cobalt nitrate do not demonstrate the same results.

Before applying surface coating 30, the swash plate 20 is exposed to a cleaning solution which removes surface oils and prepares the part for the coating application. Cleaning methods typically include solvent, acid or alkaline washings. The parts are then exposed to the solution for 5–6 minutes to coat.

The thickness of the surface coating 30 is preferably from 0.8 to 2.5 microns and more preferably from 1.1 to 1.8 microns. Applicants found that if the surface coating layer 30 has a thickness of less than 0.8 microns, the coefficient of friction will not be sufficiently lowered. On the other hand, if the surface coating layer 30 has a thickness of more than 2.5 micrometers, the surface coating layer 30 will be susceptive to problems concerning its strength such as to resist peeling-off.

According to the present invention, the coefficient of friction between swash plate 20 and shoe 24 is small so that the smooth sliding of shoe 24 on the swash plate 20 is ensured. The surface coating layer 30 is superior in strength thereby reducing the amount of abrasion which occurs thereon. Still further, seizure of the shoe 24 to the surface of swash plate 20 is prevented even when a liquid refrigerant is compressed or the compressor is operated under unfavorable circumstances such as insufficient lubrication of the sliding parts caused by leaks of refrigerant gas to the outside of the compressor.

Consequently, by the effects described above, the swash plate compressor according to the present invention can satisfactory withstand very severe use and achieve long service life.

Experimental Results

EXAMPLE 1

According to the swash plate type compressor as shown in FIG. 1, the swash plate 20 is composed of a swash plate body 20 made of an aluminum alloy containing 10–12.5% by weight of silicon, and the surface coating layer 30 formed on the whole surface of the swash plate body 20. The surface coating layer 30 consists of tin and cobalt as described below.

The surface coating layer 30 was formed by the following process:

The swash plate 20 was cleaned with alkaline cleaner at 140° F. for 5 minutes. The swash plate body 20 is immersed for 5 minutes into a aqueous bath solution which contains 6.6 wt. % potassium stannate and 0.007 wt. % cobalt chloride by weight, and which was kept at 130°–147° F. It was then taken out from the Sn/Co bath and water washed. As a result, a surface coating layer 30 consisting of tin and cobalt was formed over the whole surface of the swash plate body 20. The resultant surface coating layer 30 had a thickness of 1.0 micrometers and was composed of 99.5 wt. % tin, and 0.5 wt. % cobalt by weight.

EXAMPLE 2

The swash plate body 20 as in Example 1, wherein the surface coating layer 30 was formed by the following process:

The swash plate 20 was cleaned with alkaline cleaner at 140° F. for 5 minutes. The swash plate body 20 is immersed for 5 minutes into a aqueous bath solution which contains 6.6 wt. % potassium stannate and 0.005 wt. % cobalt chloride by weight, and which was kept at 130°–147° F. It was then taken out from the Sn/Co bath and water washed. As a result, a surface coating layer 30 consisting of tin and cobalt was formed over the whole surface of the swash plate body 20. The resultant surface coating layer 30 had a thickness of 1.0 micrometers and was composed of 0.36 wt. % cobalt and the balance being tin.

EXAMPLE 3 (A COMPARATIVE EXAMPLE)

The swash plate body as in Example 1 and 2 was coated with a Sn coating composition, not according to the present invention as follows:

The swash plate body 20 is immersed for 5 minutes into a aqueous solution which contains 6.6 wt. % potassium stannate, and which was kept at 130°–147° F. It was coated, taken out from the solution and water washed. As a result, a surface coating layer 30 having a thickness of 1.0 micrometers was composed of 100 wt. % tin was formed over the whole surface of the swash plate body 20.

Figure 2A:
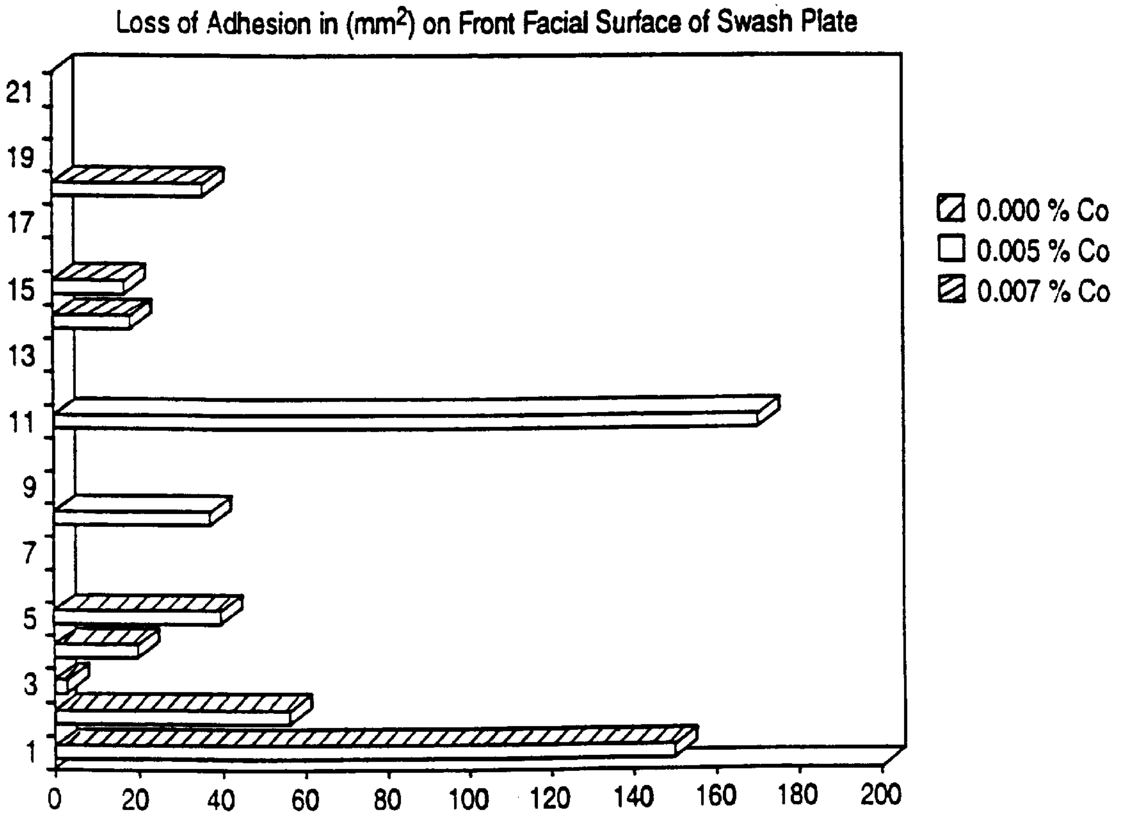
FIG. 2*a* (front facial surface) is a chart of 2 hour compressor adhesion performance test performed on an embodiment of the present invention and a conventional tin swashplate.
Figure 2B:
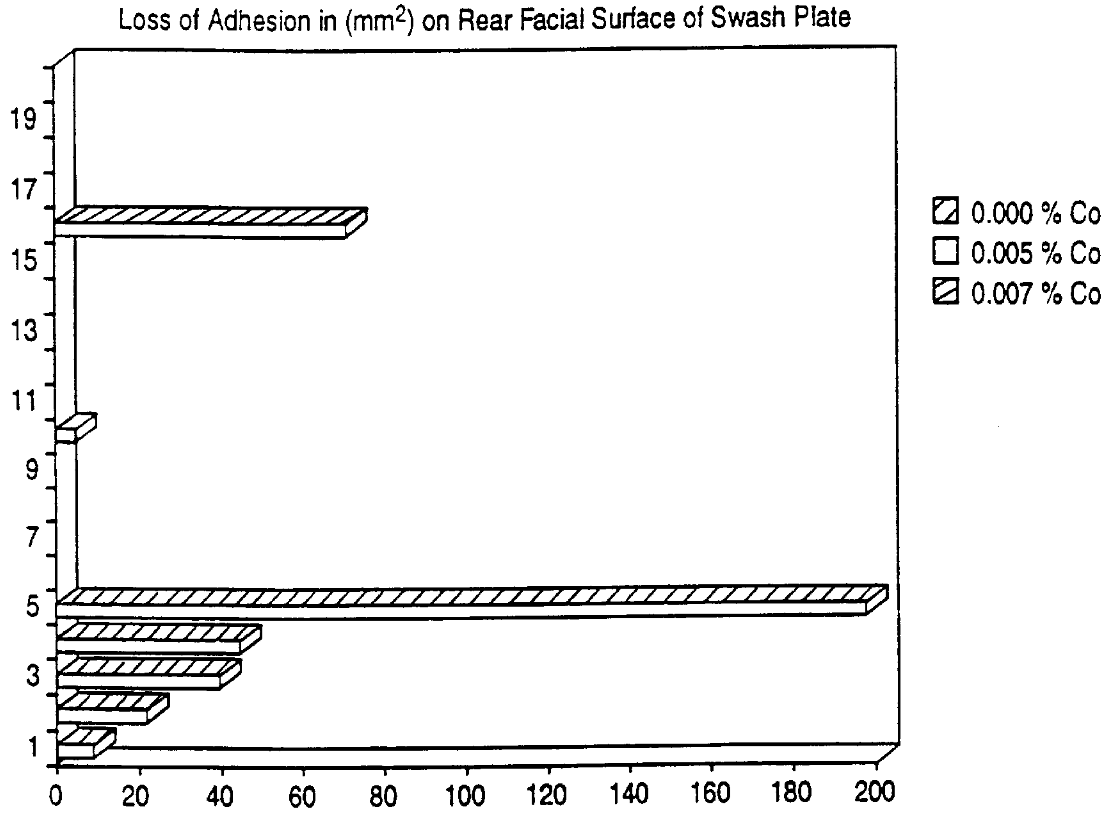
FIG. 2*b* (rear facial surface) is a chart of 2 hour compressor adhesion performance test performed on an embodiment of the present invention and a conventional tin swashplate.

FIGS. 2*a* and 2*b* illustrates the comparison of the two hour calorimeter test administered to three different coatings prepared above. The calorimeter test measures accelerated wear and loss of adhesion of a typical tin coating. Test samples are subject to the same conditions and then the wear of the coating is compared. The assembled compressor is subjected to both high and low speed usage. A test compressor pump was run for 1 hour at point 19, which simulates low speed usage, and 1 hour at point 26 conditions, which simulates high speed usage. At point 19, and 26 the compressor is subjected to 1000 and 3000 RPMs respectively. The data comparing the three coatings prepared in Examples 1–3 is compiled in Table 1. The wear of both facial surfaces 26 of the swash plate body 20 was compared.

| Wt. % Co | Loss of Adhesion | |
|---|---|---|
| in solution | Front Surface (mm) | Rear Surface (mm) |
| 0 | 150 | 10.4 |
| | 56.8 | 23.76 |
| | 4.15 | 39.93 |
| | 20.46 | 43.8 |
| | 40.2 | 194.94 |
| 0.005 | 0 | 0 |
| | 0 | 0 |
| | 38 | 0 |
| | 0 | 0 |
| | 0 | 6.3 |
| | 170.4 | 0 |

-continued

| Wt. % Co in solution | Loss of Adhesion | |
|---|---|---|
| | Front Surface (mm) | Rear Surface (mm) |
| 0.007 | 0 | 0 |
| | 0 | 0 |
| | 18 | 0 |
| | 16.8 | 0 |
| | 0 | 70 |
| | 0 | 0 |
| | 36 | 0 |
| | 0 | 0 |
| | 0 | 0 |
| | 0 | 0 |

As indicated in FIGS. 2*a*, 2*b* and Table 1, the adhesion measured for swash plates 20 having the surface coating layer 30 in accordance with the embodiments of the present invention were much higher than that for the conventional type coating described in comparative Example 3. Also, a comparison between different levels of cobalt of the present invention, shows that the addition of higher levels of cobalt in the composition of the surface coating layer is effective in improving the adhesion and wear resistance of the swash plate 20. Thus, surface coating layer 30 of the comparative example 3, containing only tin, is more susceptive to rapid abrasion than a coating of tin and cobalt according to the present invention.

As is apparent from the test results shown in FIGS. 2*a* and 2*b*, according to the present invention, the occurrence of loss of adhesion of the coating is greatly reduced due to the effect of the surface coating layer 30 although the swash plate type compressor is operated under severe conditions.

Swash plates 20 coated with the tin/cobalt coating do not exhibit the poor adhesion and poor wear resistance of pure tin coating because of the added cobalt.

Further Experimental Results

A standard tape adhesion test was administered on the samples prepared in examples 1–3. The test measures the amount of coating that can be removed when placed under stress. 3M 610 cellophane tape was applied to the coated swashplates in 2–3 mm strips. The tape was rubbed with a rubber eraser to ensure the adhesion of the tape and then the tape was removed in one quick motion in which a 90 degree angle was kept between the tape and the surface of swash plate 20. The coating with no cobalt, (all tin) showed poorest adhesion. Adhesion improved correspondingly with increasing amounts of cobalt in the coatings, i.e., the cobalt/tin coating with 0.007 wt. % Co had improved adhesion over the 0.005 wt. % cobalt/tin coating.

As discussed above, as higher amounts of chelate, such as EDTA, or other suitable substances are included in the bath, more cobalt can be introduced into the bath solution. The following example illustrates this embodiment of the present invention.

EXAMPLE 4

A stock tin bath saturated with cobalt had 500 ppm additional EDTA added. The insoluble cobalt precipitate dissolved after chelate mixed into the bath resulting in a clear pink solution. Next, additional cobaltous chloride solution was added into the mixture and a swashplate coated. The standard tape adhesion test from examples 1–3 was performed, with no coating pull off exhibited.

More additions of cobaltous chloride were made to the test solution and swashplates coated. The tape adhesion tests were performed, with no coating pull off. During the experiment progression, it was noted that the coating became darker with increased cobalt concentration in solution. Finally, at 3000 ppm, or 0.3% cobalt (equivalent to 6300 ppm or 0.63 wt. % cobalt chloride) in the bath solution, some coating pull off was noted, an increase in the coating layer thickness, and the bath began to show evidence of insoluble cobalt, finely divided, bluish particles suspended in the solution. The resultant swashplate coating also had a darker color than previous samples with lower cobalt concentrations in solution. Further attempts to add more chelate to the bath showed no ability to dissolve the insoluble cobalt in the 3000 ppm (6300 ppm cobalt chloride) concentration solution, bath breakdown was achieved.

Also, according to the present invention, even in the state where the surface coating layer 30 of the swash plate 20 is gradually reduced by abrasion, the primary crystal silicon dispersed on the surface of the swash plate body 20 was exposed and sticks on the swash plate surface 20. Since primary crystal silicon has a great hardness, the further abrasion of the surface coating layer 30 is prevented.

It will be obvious to those of skill in the art that various modifications variations may be made to the foregoing invention without departing from the spirit and scope of the claims that follow.

We claim:

1. An article having an aluminum or aluminum alloy surface which carries a single layer coating of tin with 0.2 to 10.0 wt. % cobalt, the coating being formed by chemical conversion whereby at least a portion of said surface is exposed to an aqueous conversion coating bath for aluminum, the bath containing soluble tin and cobalt compounds in amounts sufficient to provide said conversion coating on said aluminum surface which, during use of the article, is exposed to sliding friction.

2. The article of claim 1, wherein said aluminum alloy comprises 13% to 30% silicon by weight.

3. The article of claim 1, wherein said aluminum alloy comprises 13% or less by weight of silicon.

4. The article of claim 3, wherein said aluminum alloy comprises an aluminum—silicon alloy having about 10–12.5% by weight of silicon.

5. The article of claim 1, wherein the thickness of said surface coating layer is from 0.8 to 2.5 microns.

6. The article of claim 1, wherein the thickness of said surface coating layer is from 1.1–1.8 microns.

7. The article of claim 1, wherein the coating comprises 0.2–2.1 wt. % cobalt.

8. The article of claim 1, wherein the coating comprises 0.3–1.1 wt. % cobalt.

9. The article of claim 1, wherein said bath is maintained at a temperature of at 120–150° F.

10. The article of claim 1, wherein said article is a piston or a swashplate.

11. The article according to claim 1, wherein said bath further contains chelates.

12. The article according to claim 1, wherein said cobalt in said bath is provided by cobalt chloride.

13. A method of coating an article having a surface of aluminum or aluminum alloy by conversion coating techniques comprising the step of:

exposing at least a portion of said aluminum or aluminum alloy surface to an aqueous conversion coating bath for aluminum at elevated temperatures, said bath comprising tin and cobalt in such amounts to provide a tin conversion coating with 0.2 to 10 wt. % cobalt and the balance being tin on said surface.

14. The method according to claim 13, wherein said cobalt in said bath is provided by cobalt chloride.

15. The method according to claim 13, wherein said aluminum alloy comprises 13% to 30% silicon by weight.

16. The method of claim 13, wherein the thickness of said surface coating layer is from 0.8 to 2.5 microns.

17. The method of claim 13, wherein the coating comprises 0.2–2.1 wt. % cobalt.

18. The method of claim 13, wherein the coating comprises 0.3–1.1 wt. % cobalt.

* * * * *